Oct. 31, 1967    B. H. MOORE    3,349,637
ROTARY ACTUATOR FOR PUSH-PULL CABLES
Filed Oct. 1, 1965    3 Sheets-Sheet 1

INVENTOR.
BRUCE H. MOORE
BY Hamilton & Cook
ATTORNEYS

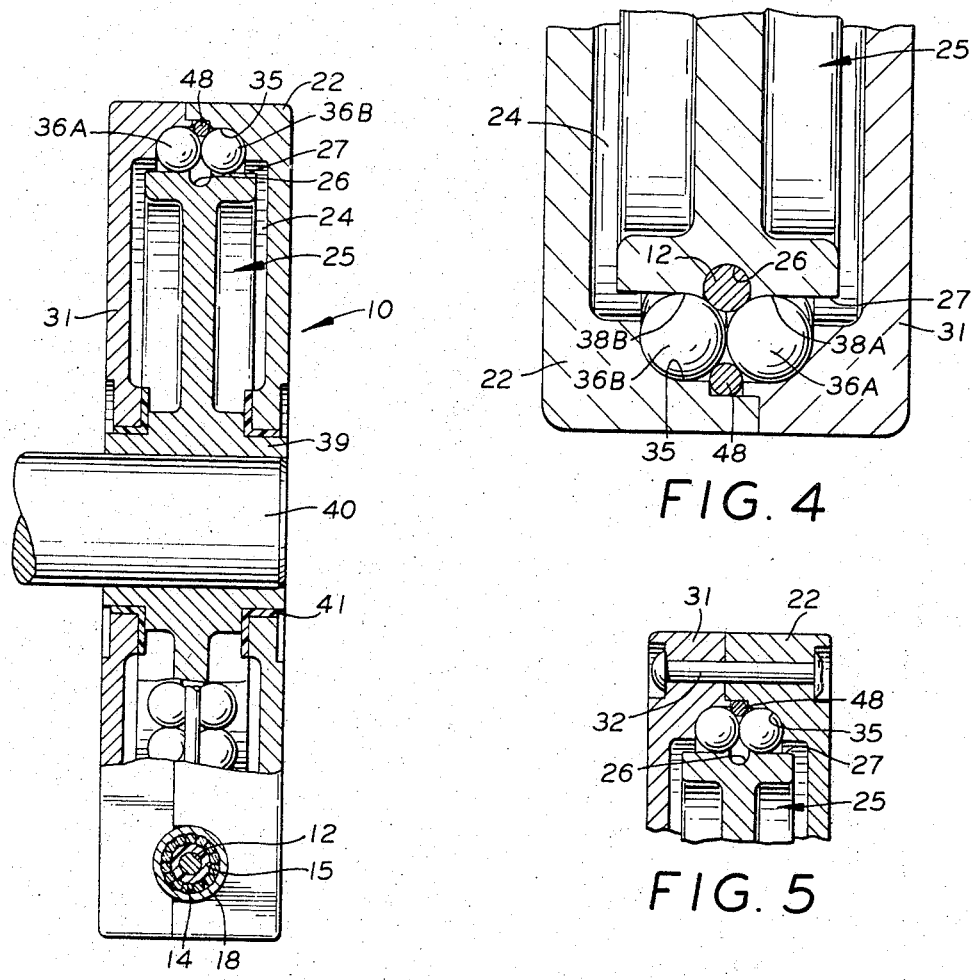
FIG. 3
FIG. 4
FIG. 5
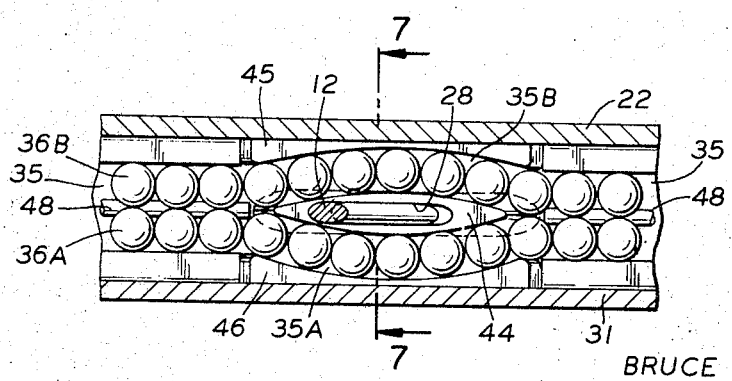
FIG. 6
INVENTOR.
BRUCE H. MOORE
BY Hamilton & Cook
ATTORNEYS Oct. 31, 1967  B. H. MOORE  3,349,637
ROTARY ACTUATOR FOR PUSH-PULL CABLES
Filed Oct. 1, 1965  3 Sheets-Sheet 3
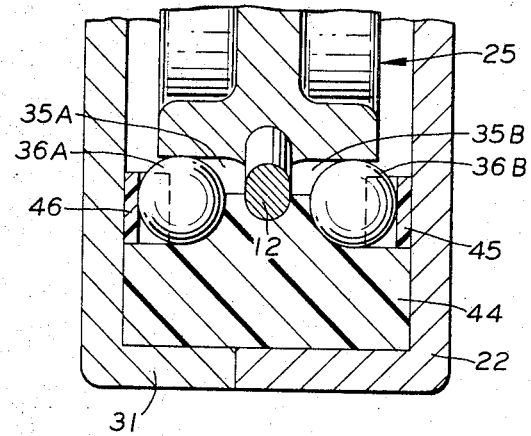
FIG. 7
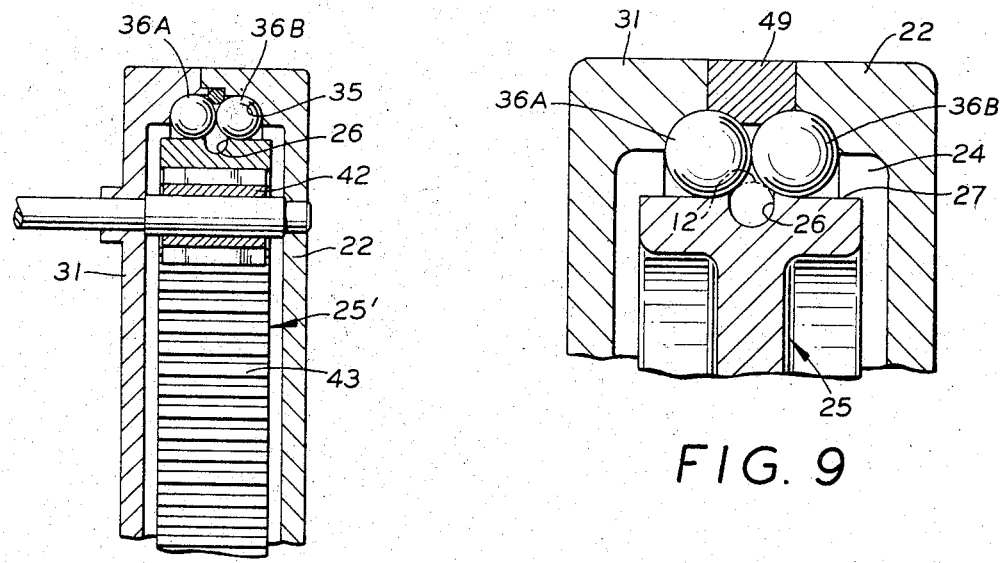
FIG. 8
FIG. 9
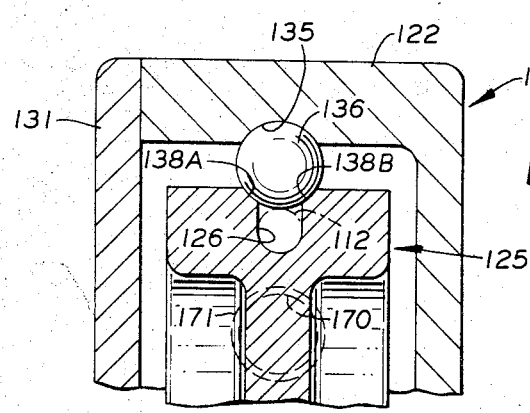
FIG. 10
INVENTOR.
BRUCE H. MOORE
BY Hamilton & Cook
ATTORNEYS

United States Patent Office 3,349,637
Patented Oct. 31, 1967

3,349,637
ROTARY ACTUATOR FOR PUSH-PULL CABLES
Bruce H. Moore, Hudson, Ohio, assignor to Morse Controls Inc., a corporation of Ohio
Filed Oct. 1, 1965, Ser. No. 491,994
12 Claims. (Cl. 74—501)

ABSTRACT OF THE DISCLOSURE

A rotary actuator for the reciprocable core of a push-pull cable. The actuator has an annular drive member rotatably received in a housing. The core is attached to the drive member and is receivable in a peripheral groove therein. At least one row of contiguously interengaged balls are freely movable peripherally in a channel in the housing generally opposite the peripheral groove in the drive member so that they engage the core received therein. Means are provided to rotate the drive member in one direction to wind the core into said groove and in the other direction to unwind the core therefrom.

---

The present invention relates generally to push-pull cables used to transmit mechanical motion. More particularly, the present invention relates to the mechanism by which a push-pull cable is actuated to transmit mechanical motion. Specifically, the present invention relates to an improved actuating mechanism by which the application of selective rotary motion imparts corresponding reciprocation to the core of a push-pull cable for transmitting mechanical motion.

Push-pull cables, generally, are well known to the art as devices capable of transmitting mechanical motion in either direction when at least the ends of the cable casing are satisfactorily clamped in position. Although the prior art knows many constructions for push-pull control cables, an exemplary form employs a casing constructed with a plurality of wires laid contiguously in a long pitched helix around the outer periphery of a flexible plastic tube. The helically arranged wires of the casing are maintained in their proper position solely by a plastic cover on the smaller cables and by a reinforcing spread helix of wire, or flat metallic ribbon, in conjunction with the plastic cover, in larger cables. This construction provides a casing with the required flexibility and permits reciprocation of the cable core therein with the maximum efficiency.

The plastic tube which comprises the innermost element of the cable casing not only acts as a bearing for the core of the cable which is slidable within the casing, but also acts to protect the casing wires from the natural elements having access to the interior of the tube.

The plastic cover which comprises the outermost element of the cable casing similarly not only acts as a structural member to retain the casing wires in the coil shape, but also acts as a protective member to shelter the wires from the natural elements having access to the exterior of the casing.

Fittings are provided at each end of the cable casing to provide a means for securing the control cable in operative position and to seal, as well as possible, the ends of the wires from the elements.

The desire to translate applied rotative motion into the linear reciprocal motion available to a push-pull cable core has engendered complex mechanisms.

One known prior construction adapts the cable core for engagement directly with a pinion so that the application of rotative forces to the pinion reciprocates the cable core. This is done by spirally winding a single wire around the core and forming the pinion teeth especially to engage the pitch of the wire wound onto the core. However, such an arrangement greatly increases the frictional resistance between the core and the innermost element of the cable casing, even when the innermost element is a plastic tube, because the core tends to indent into the plastic tube, particularly at bends in the cable, as the load increases.

In another known construction the core is attached to the periphery of an internally toothed gear plate. The drawback to this arrangement lies in the fact that, as the gear plate is rotated to apply compressive stresses to the core, the core tends to move radially away from the gear plate. To date various backings have been tried to restrain the core against this radially outward movement, but all have deficiencies which make them unsatisfactory for heavy loading and maximum rotation. One backing comprises a fixed plastic ring encircling the periphery of the gear plate which confines the core against moving radially outwardly, but this arrangement has been found to impart excessively high frictional resistance against movement of the core by the application of compressive forces.

Another backing devised in an attempt to obviate the difficulties attendant upon applying compressive forces by the gear plate type of rotary actuator utilizes a plurality of rotatably mounted rollers circumferentially spaced about the gear plate and engageable by the core as it moves radially under the application of compressive forces induced by the rotation of the gear plate. With this type actuator the core tends to flex severely between its points of contact with the rollers causing backlash, and this, together with the spindle mounting of the rollers, deprives such constructions of their promised efficiency.

It is therefore a primary object of the present invention to provide a rotary actuator for push-pull cables which has low frictional resistance even under maximum loading.

It is another object of the present invention to provide a rotary actuator, as above, which is capable of maximum angular rotation with negligible backlash.

It is a further object of the present invention to provide a rotary actuator which has the above characteristics and yet is compact and inexpensive to manufacture and maintain.

These and other objects, together with the advantages thereof over existing and prior art forms, which will become apparent from the following specification are accomplished by means hereinafter described and claimed.

One preferred and three alternative embodiments of the subject invention are shown by way of example in the accompanying drawings and are described in detail without attempting to show all of the various forms and modifications in which the invention might be embodied; the invention being measured by the appended claims and not by the details of the specification.

In the drawings:

FIG. 3 is a cross section taken substantially on line 3—3 of FIG. 2;

FIG. 4 is an enlarged cross section taken substantially on line 4—4 of FIG. 2;

FIG. 5 is a cross section taken susbtantially on line 5—5 of FIG. 2;

FIG. 6 is a cross section taken substantially on line 6—6 of FIG. 2;

FIG. 7 is an enlarged cross section taken substantially on line 7—7 of FIG. 6;

FIG. 8 is a view similar to FIG. 3 of a modification of the rotary actuator depicted in FIGS. 1–6, inclusive;

FIG. 9 is similar to an enlarged partial area of FIG. 3 depicting a further modification; and, FIG. 10 is a view similar to FIG. 9 of a still further modification.

In general, a rotary actuator embodying the concept of the present invention has a housing in which an annular drive member, or rotor, is rotatably received. The periphery of the drive member is grooved to receive a push-pull cable core to which the drive member is attached. Radially outwardly of this groove the housing contains a peripheral channel in substantial opposition thereto and in which is received at least one row of a plurality of contiguously interengaged balls.

The drive member is selectively rotatable to wind the core into the groove and is reversely rotatable to unwind the core therefrom. As the drive members is so rotated, the balls move periphreally in the channel primarily to engage and maintain the radial position of the core in said groove and permit it to exit therefrom at a preselected location.

Figure 1:
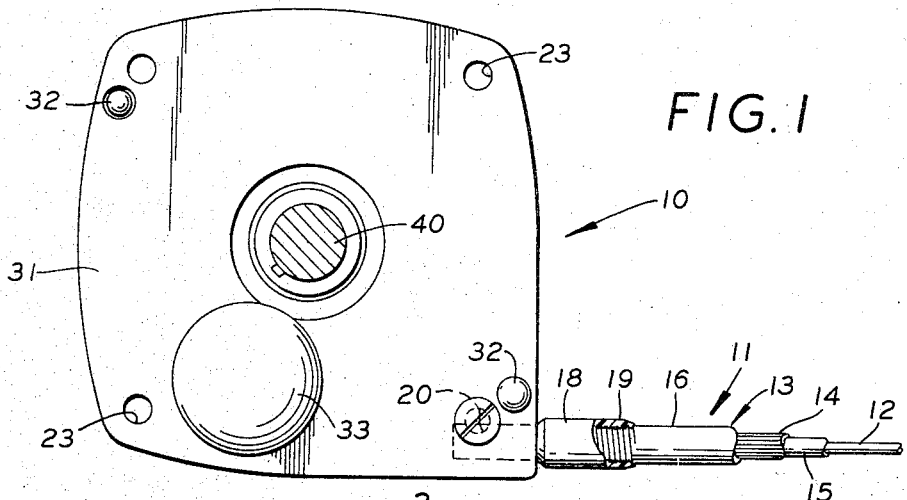
FIG. 1 is a frontal elevation of a rotary actuator embodying the concept of the present invention.

Referring more particularly to FIG. 1 of the drawings, the improved rotary actuator, indicated generally by the numeral 10, is depicted connected to the end of a push-pull cable 11.

The push-pull cable 11 may be of any conventional construction having a core 12 reciprocably slidable within a casing 13 to transmit mechanical motion by the application of either tensile or compressive forces to the core 12. In the exemplary construction depicted the casing is formed of a plurality of casing wires 14 contiguously laid, in the form of a long pitch helical coil, about the radially outer surface of an inner, flexible plastic tube 15 which extends the full length of the casing 13. An outer cover 16 encases the coil of wires 14 up to within a short distance from the ends thereof.

A fitting 18 is positioned over the end of the cable casing 13 and is cold swaged, or otherwise suitably connected, onto the exposed portions of the cylindrical grouping of wires 14.

A plurality of annular ribs 19 may be provided within the fitting 18 to be crimped down onto the cover 16 to effect a seal between the fitting 18 and the cover 16.

A retaining notch 20 extends transversely through one side of fitting 18 for attaching the cable casing 13 to an anchor point. As shown, a mounting bolt 21 may be screwed into the housing 22 of the actuator 10 in such a way as to lie within the notch 20, and thereby anchor the fitting 18 to the housing 22. The housing 22 may, in turn, be attachable in the desired location by a plurality of mounting bolts, not shown, insertably received through mounting holes 23.

The interior of the housing 22 has an annular recess 24 in which is received a rotatable drive member 25. A peripheral groove 26 is provided on the outer surface 27 of the drive member 25 to accept the push-pull cable core 12. The core 12 extends through the fitting 18 received within a portion of the passage, or entrance bore, 28 communicating from exteriorly of the housing 22 and intersecting the recess 24 substantially tangentially of the groove 26. While the outermost portion of the entrance passage 28 has a diameter sufficiently large to receive the fitting 18, the innermost portion is of reduced diameter to support the core 12 circumferentially against buckling under compressive loading.

An anchor bore 29 extends angularly inwardly of the drive member 25 from the peripheral groove 26 into which the end of the core 12 may be inserted and locked by one or more clamping means, such as the two Allen screws 30 depicted.

A cover plate 31 may be secured to the housing 22 semipermanently, as by rivets 32, so long as a removable plug 33 is provided therein to permit access to the Allen screws 30 for connecting and disconnecting a core 12 to the driver member 25. The access plug 33 may be attached to the cover plate 31 by threads, spring clips or any of a host of other means well-known to the art. Convenience dictates that the diameter of the access plug 33 should be sufficient not only to tighten or loosen Allen screws 30 but also to view the axially oriented gauge opening 34 which intersects the anchor bore 29 and permits visual observance that the core 12 is fully inserted into the anchor bore 29.

At least one channel 35 is formed in the housing 22 peripherally of the recess 24 so as substantially to oppose the groove 26 in the drive member 25. At least one row of a plurality of contiguously interengaged balls 36 is received in the channel 35 to engage and maintain the core 12 radially positioned in the groove 26.

As shown in the preferred construction depicted in FIGS. 1–6, inclusive, the channel 35 is of sufficient axial width to hold two side-by-side rows of balls 36A and 36B. In the enlarged area depicted in FIG. 4 it is readily apparent that the balls 36A and 36B not only engage the core 12 but also engage the races 38A and 38B formed radially of the drive member 25 adjacent each side of the core receiving groove 26.

When the drive member 25 is rotated, the balls 36 move peripherally in the channel 35. Being thus free to move, the balls 36 provide a low friction bearing against which the core 12 can move and can also double as a low friction bearing for the drive member 25 itself. Also, because the balls are non-spindle mounted, they may be of sufficiently small diameter that the core is substantially fully supported so that backlash is negligible.

In the preferred embodiment the drive member 25 is provided with a central hub 39 into which may be keyed a shaft 40 for rotating the drive member 25. In such a construction it is advantageous to seal both the housing 22 and the cover plate 31 circumferentially of the shaft 40, and such a seal may itself well comprise a bearing 41 acting supplementarily to the bearing provided by the action of the balls 36 against their races 38. However, there are many applications where it is desirable to gear down the rotation of the drive member 25 with respect to the rotation of its driving mechanism, as, for example, when the rotary actuator is applied to a steering mechanism. For such applications a pinion 42 may be journaled in the housing 22 and cover plate 31 to engage the teeth 43 provided interiorly of the drive member 25', as shown in FIG. 8. With the bearing of the drive member 25' afforded solely by the balls 36 the hub and other central structure of the drive member 25' may be eliminated, if desired.

In either event, however, the peripheral movement of the balls 36 in the channel 35 must permit the core 12 to pass from the entrance passage 28, across the channel 35 and into the groove 26. To do this, the two rows of balls 36A and 36B are diverted axially apart at the intersection of the bore 28 and the channel 35. This is accomplished by the boat-shaped guide, or diverter, 44 (FIGS. 6 and 7) which, together with the laterally spaced guide shoe 45 on the housing 22, forms an extension 35B of channel 35 for the passage of balls 36B, and, together with the laterally spaced guide shoe 46 carried on the cover plate 31, forms an extension 35A of the channel 35 for the passage of balls 36A. The diverter 44 may either be formed as an integral part of the housing or may be a plastic insert, as depicted.

Figure 2:
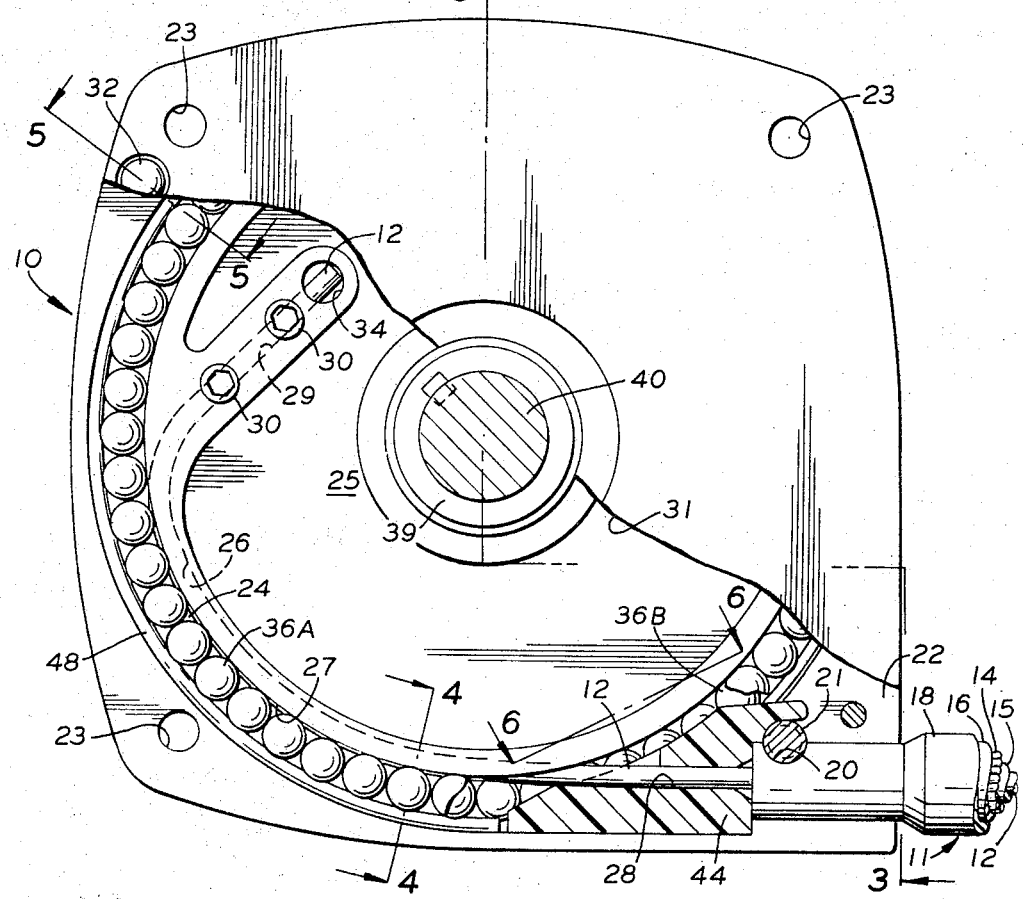
FIG. 2 is an enlarged area of FIG. 1 with the cover plate partially broken away.

As best seen in FIGS. 2, 3 and 4, a split spacing ring 48 is positioned in the channel 35 on the radially outer side of the balls 36 from the groove 26. The ring 48 lends fuller support to the individual balls 36 for performing their bearing function and also assures that the balls do not become displaced into groove 26 when positioned around that circumferential portion of drive member 25 in which the groove 26 is devoid of core 12. Such a guide 48 is used in preference to a lip 49 (FIG. 9) directed radially inwardly of the recess 24 from the housing 22 because it facilitates assembly of the actuator 10, although either are acceptable.

A further embodiment 110 is depicted in FIG. 10, wherein the channel 135 is of axial width sufficient only to receive a single row of balls 136. In such a construction it is preferred that the groove 126 is of sufficient depth that the drive member 125 extends radially beyond the core 112. This permits the radially outer portion of the groove 126 to be flared to opposing races 138A and 138B for engagement with the balls 136 so that they may be utilized not only as the backing for the core 112 but also as the bearing for the drive member 125. The parting line of the cover plate 131 to the housing 122 may be displaced from the channel 135 and the actuator may still be readily assembled by admitting the balls 136 through an access vent 170 which may be selectively sealed by a plug 171.

From the disclosure of the several modifications specifically described herein it should be manifestly apparent that a rotary actuator embodying the concept of the present invention provides a highly efficient mechanism for translating rotary motion of the reciprocal motion of a push-pull cable core, and that an angular rotation of approximately 330° without backlash is readily available under even mximum loading.

What is claimed is:

1. A rotary actuator for a push-pull cable having a reciprocable core, said actuator comprising, a housing, an annular drive member rotatably received within said housing, a peripheral groove in said drive member, means for attaching said cable core to said drive member so that said core is received in said groove, at least one peripheral channel in said housing substantially opposing said groove, a plurality of contiguously interengaged balls received in said channel and engaging the core received in said groove, means to rotate said drive members selectively to wind said core into said groove and to unwind said core therefrom, said balls freely movable peripherally in said channel upon rotation of said drive member to engage and maintain said core in said groove.

2. A rotary actuator, as set forth in claim 1, in which there are a pair of substantially parallel, peripheral grooves in said housing with a plurality of contiguously interengaged balls received in each channel engaging the core received in said groove.

3. A rotary actuator, as set forth in claim 2, in which the plurality of balls also engage said drive member as the rotational support therefor.

4. A rotary actuator, as set forth in claim 1, in which the peripheral channel receives two rows of contiguously interengaged balls, both rows of said balls movable peripherally in said channel to engage and maintain said core radially of said groove.

5. A rotary actuator, as set forth in claim 4, in which the housing has an entrance bore communicating from exteriorly thereof substantially tangentially of said groove and through which said core is slidably received, said housing also having a guide means in said channel adjacent said entrance bore for separating said two rows of balls for the passage of said cable core from said groove to said entrance bore.

6. A rotary actuator, as set forth in claim 5, in which a spacing ring is positioned in said channel on the radially outer side of said balls from said groove.

7. A rotary actuator for a push-pull cable having a core receprocably slidable in a casing, said actuator comprising, a housing, an annular recess formed in said housing, a drive member having an annular outer surface rotatably positioned in said recess, a groove in the outer surface of said drive member, an entrance passage extending from exteriorly of said housing into said recess, said passage oriented generally tangentially of the groove in said drive member, means for anchoring said cable casing to said housing in proximity to said entrance passage, said cable core extending through said passage and received in at least a portion of said groove, means for attaching said core to said drive member, a channel in the periphery of said recess substantially opposing said core receiving groove and diverting axially therefrom at the intersection of said passage and said recess, at least one row of contiguously interengaged balls received in said channel, means to rotate said drive member, said balls moving peripherally in said channel upon rotation of said drive member to engage and maintain said core in said groove beyond said entrance passage.

8. A rotary actuator, as set forth in claim 7, in which the outer surface of said drive member has at least one race for engaging said balls, the engagement of said balls and said race bearingly supporting said drive member for rotation.

9. A rotary actuator, as set forth in claim 7, in which there are two side-by-side rows of balls in said channel engaging said core.

10. A rotary actuator, as set forth in claim 9, in which the outer surface of said drive member has a race for engaging the balls of at least one of said side-by-side rows, the engagement of said balls and said race bearingly supporting said drive member for rotation.

11. A rotary actuator, as set forth in claim 10, in which a C-shaped spacing ring is positioned in said channel on the radially outer side of and medially side-by-side rows of balls.

12. A rotary actuator, as set forth in claim 10, in which a lip extends radially inwardly from said channel terminating medially of said side-by-side row of balls and on the radially outer side thereof.

References Cited

UNITED STATES PATENTS

| | | |
|---|---|---|
| 578,556 | 3/1897 | Flindall. |
| 732,490 | 6/1903 | York _____ 308—185 |
| 1,552,161 | 9/1925 | Houghton _____ 254—190 |
| 1,790,752 | 2/1931 | Kaiser. |
| 2,171,886 | 9/1939 | Musselman. |
| 2,222,588 | 11/1940 | Williams _____ 74—501 X |
| 2,457,910 | 1/1949 | McLaren et al. _____ 74—501 |
| 2,926,537 | 3/1960 | Pieterse _____ 74—501 X |

FOREIGN PATENTS

| | | |
|---|---|---|
| 625,181 | 4/1927 | France. |

FRED C. MATTERN, JR., *Primary Examiner.*

C. F. GREEN, *Assistant Examiner.*